United States Patent
Manfred et al.

(10) Patent No.: US 10,759,108 B2
(45) Date of Patent: Sep. 1, 2020

(54) PULSATING PIPE MOLD WITH SPIGOT CONNECTOR

(71) Applicants: Lupke A. A. Manfred, Thornhill (CA); Lupke A. Stefan, Thornhill (CA)

(72) Inventors: Lupke A. A. Manfred, Thornhill (CA); Lupke A. Stefan, Thornhill (CA)

(*) Notice: Subject to any disclaimer, the term of this patent is extended or adjusted under 35 U.S.C. 154(b) by 0 days.

(21) Appl. No.: 16/388,111

(22) PCT Filed: Oct. 20, 2017

(86) PCT No.: PCT/CA2017/051254
§ 371 (c)(1),
(2) Date: Apr. 18, 2019

(87) PCT Pub. No.: WO2018/072032
PCT Pub. Date: Apr. 26, 2018

(65) Prior Publication Data
US 2019/0299516 A1    Oct. 3, 2019

(30) Foreign Application Priority Data
Oct. 21, 2016 (CA) ...................... 2946104

(51) Int. Cl.
*B29C 53/80* (2006.01)
*B29C 53/30* (2006.01)
*B29L 23/00* (2006.01)

(52) U.S. Cl.
CPC .............. *B29C 53/80* (2013.01); *B29C 53/30* (2013.01); *B29L 2023/22* (2013.01)

(58) Field of Classification Search
CPC ...... B29C 53/80; B29C 53/30; B29L 2023/22
USPC .................... 425/371, 72, 384, 394, 396
See application file for complete search history.

(56) References Cited

U.S. PATENT DOCUMENTS

| | | | | |
|---|---|---|---|---|
| 3,981,663 A | * | 9/1976 | Lupke | B29C 49/0021 425/326.1 |
| 4,199,314 A | * | 4/1980 | Lupke | B29C 33/10 425/532 |
| 4,789,322 A | * | 12/1988 | Chan | B29O 33/36 425/336 |

(Continued)

FOREIGN PATENT DOCUMENTS

| WO | 02/20235 A2 | 3/2002 |
|---|---|---|
| WO | 2016/082024 A1 | 6/2016 |

OTHER PUBLICATIONS

Dias, F.; Supplementary European Search Report issued in connection with corresponding European Application No. 17862958.0; dated May 4, 2020.

*Primary Examiner* — Nahida Sultana
(74) *Attorney, Agent, or Firm* — Laurie Wright; Blake, Cassels & Graydon LLP (57) ABSTRACT

A pulsating corrugator is provided with at least one secondary mold block that is selectively used for forming a spigot connection as the corrugated or ribbed pipe is formed. Preferably, the primary mold blocks used to form the corrugated pipe are also used to assist in further cooling of the formed spigot connection once released from the secondary mold block. The corrugator also includes a controller used to provide different air pressure as the mold blocks move past extrusion outlets of an associate extruder.

5 Claims, 13 Drawing Sheets

(56) References Cited

U.S. PATENT DOCUMENTS

2004/0232579 A1* 11/2004 Lupke ............... B29C 48/303
  264/40.3
2017/0232651 A1* 8/2017 Ota ............... B29O 45/7646
  425/145

* cited by examiner

PULSATING PIPE MOLD WITH SPIGOT CONNECTOR

TECHNICAL FIELD

The present invention relates to a pipe mold for a pulsating type corrugator that includes at least one secondary mold block for selectively forming a pipe spigot connection.

BACKGROUND

A traveling mold block tunnel is commonly used with an extruder for forming double wall or a single wall pipe. A double wall corrugated plastic pipe with one wall forming the outer corrugations and an inner smooth wall of a fixed diameter is commonly produced and used in multiple applications.

Double wall corrugated pipe and, other types of ribbed double wall pipe, are often manufactured using a conventional moving mold tunnel where two trains of mold blocks circulate around an endless track and come together and move together to form a moving mold tunnel.

It is also known to mold double corrugated plastic pipe using a pulsating corrugator. In a pulsating corrugator, the relative order of the mold blocks to each other remains the same and the mold blocks move individually. For example, two adjacent mold blocks, even if separated from the pipe and returned to an initial position, do not reverse positions.

U.S. Pat. No. 7,104,777 discloses a pulsating or shuttle type corrugator where the mold blocks are designed to recognize thermal shrinkage during the molding process and the size of the mold blocks vary depending upon their order.

The present invention addresses issues associated with the manufacture of double wall corrugated plastic pipe using a pulsating corrugator. In particular, the invention relates to providing appropriate pressure for supporting the extruded molded plastic during the shifting of the mold blocks.

SUMMARY

A pulsating corrugator, according to the present invention, comprises a plurality of main mold blocks used for in line forming of corrugated pipe of a double wall construction with an inner wall smooth wall of a first diameter and an outer corrugated wall attached to and reinforcing said inner wall. Each corrugation is attached to the inner wall and extends outwardly therefrom to a second diameter that is greater than said first diameter. At least one secondary mold block is located upstream of and used in combination with said main mold blocks for selectively forming an inline double wall spigot connection as part of said corrugated pipe. The spigot connection has an inner smooth wall of said first diameter with outer corrugations attached to said inner smooth wall and of a maximum diameter intermediate said first and second diameters. The at least one secondary mold block, during forming said corrugated double wall pipe using said main mold blocks, is in a position upstream of plastic extrusion outlets used for forming the walls of the double walled corrugated pipe. A controller controls the pulsating movement of said main mold blocks and selective use of said at least one secondary mold block to move with said primary mold blocks to form said spigot connection, separate therefrom and thereafter return to said upstream position. The controller varies the pressure of an air supply that introduces support air between said extruded plastic outlets at a first pressure for each corrugation of said first diameter and at a lesser pressure for supporting a last formed spigot corrugation as the secondary mold block is released from the formed spigot connections and moved to said upstream position.

According to an aspect of the invention, mold blocks and the at least one secondary mold block, have corrugations at the same pitch and said main blocks engage said formed spigot corrugations released from said at least one secondary mold block to continue to cool said spigot corrugations.

In an aspect of the invention, the controller varies a vacuum force used with said primary mold blocks for forming said corrugations of said first diameter and exerts a reduced vacuum source when the respective main mold block engages a corrugation formed by the secondary mold blocks.

In a preferred aspect of the invention, the main mold blocks and the at least one secondary mold have the same orientation and move inwardly and outwardly relative to the formed double wall corrugated pipe in the same direction.

In yet a further aspect of the invention, the at least one secondary mold block is one secondary mold block which moves in unison with the primary mold block immediately downstream thereof with respect to both separation from the corrugated pipe and movement in the length of the pulsating corrugator.

BRIEF DESCRIPTION OF THE DRAWINGS

Preferred embodiments of the invention are shown in the drawings, wherein.

DETAILED DESCRIPTION

Figure 1:
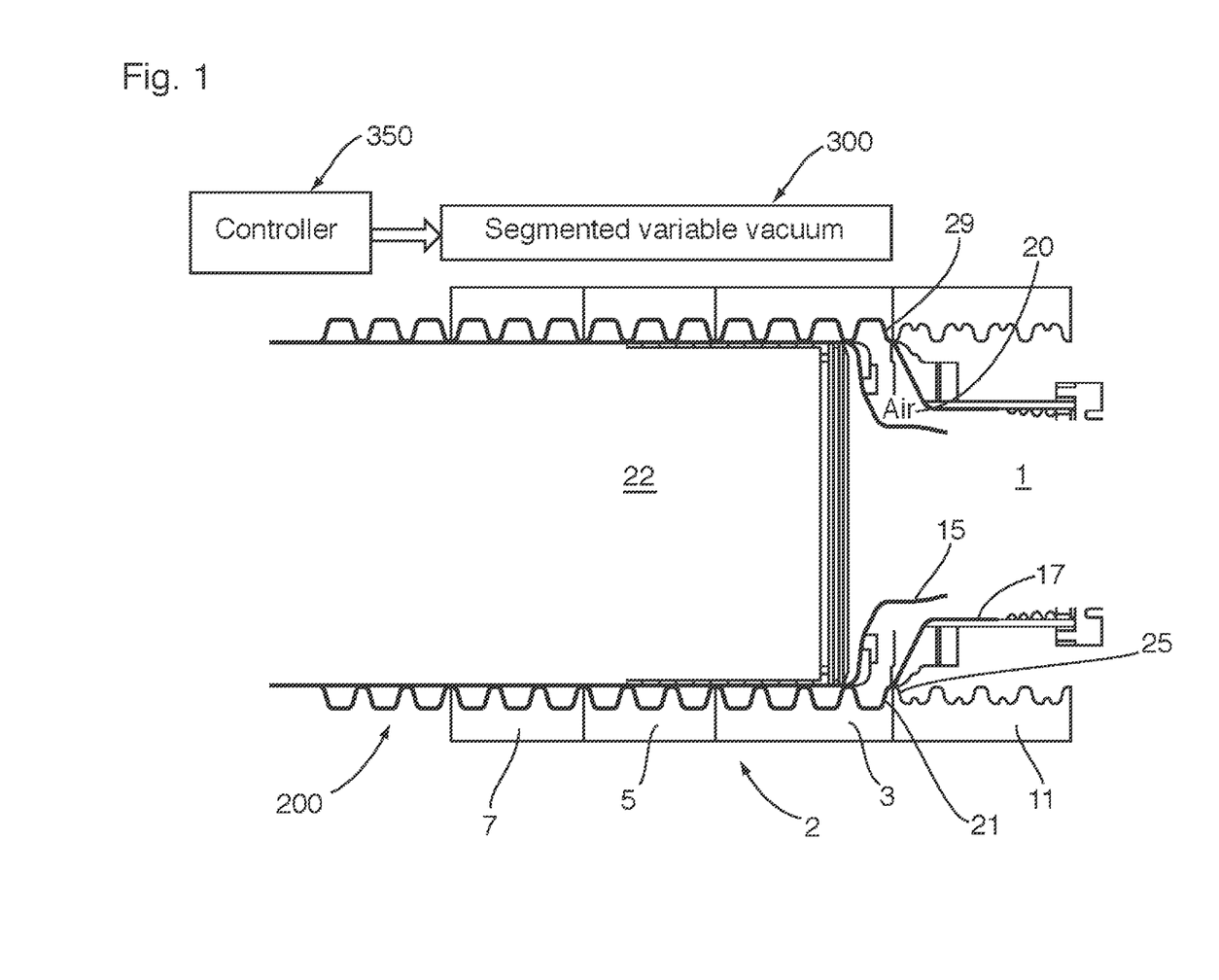
FIGS. 1 to 13 are similar horizontal sectional views through a pulsating corrugator showing a sequence of steps used in the manufacture of the double wall corrugated pipe where both the corrugator and the method of manufacture allow for forming of an integral male spigot connection as part of the molded double wall corrugated pipe.

FIG. 1, in the drawings, is a horizontal sectional view through the moving mold tunnel 2 that additionally shows a portion of the die head 1 for extruding the plastic film 17 for forming the outer corrugated wall and extruding the plastic film 15 for forming the inner smooth wall of the double wall corrugated pipe. The extruded plastic films, in combination with the moving mold blocks and the cooling plug 22, cooperate to form the double wall corrugated pipe 200.

In FIG. 1, the mold tunnel 2 comprises primary mold blocks and at least one secondary mold block. The primary mold blocks include upstream mold block 3, the intermediate mold block 5 and the downstream mold block 7. A secondary mold block 11 is shown for selectively forming a spigot connection. Although additional secondary mold blocks can cooperate, only one secondary mold block is shown for forming the inline spigot connection.

FIG. 1 also shows the partial formation of the corrugation 21 which is immediately upstream of the cooling plug 22. Support air 20 is provided in the gap between the two plastic films 15 and 17 to assist in supporting plastic film 17 and the outward deformation thereof to bring it into contact with the corrugation cavity of the upstream mold block 3. Once the film 17 becomes close to the outer wall of mold block 3, the segmented variable vacuum 300 provides a variable vacuum assist to pull the plastic film 17 against the outer shape of the mold block and, in particular, against the cavities forming the corrugations. A balance is required of the air pressure 20 to effectively encourage the film to move out into the corrugation 21, but not so great as to blow the film or distort the film 17 upstream of the corrugation 25. In FIG. 1, it can be seen that projecting surface 25 is in close proximity to the extrusion outlet for plastic film 17. With this arrangement, there is less of a tendency for film 17 to be distorted or blown upstream, but the air pressure 20 cannot be too great.

There are different arrangements for essentially controlling the vacuum force exerted through each corrugation cavity of any of the mild blocks. The ON/OFF function and/or adjustability is set by the controller 350 that also controls the mold block sequence.

Figure 2:
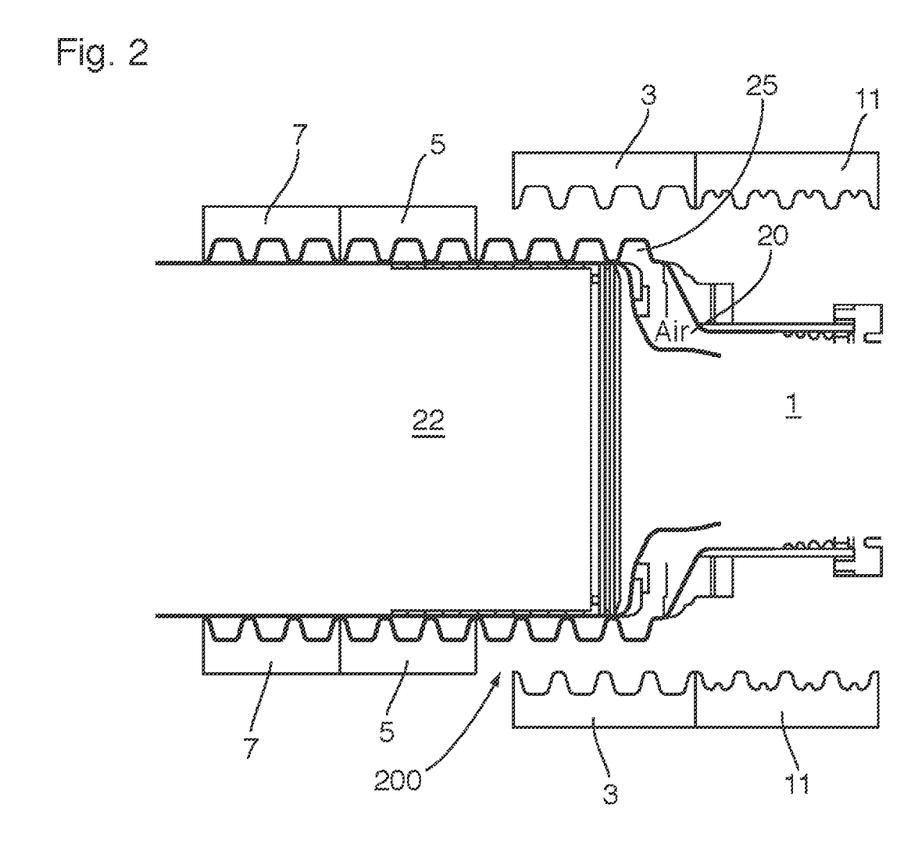

As can be appreciated, the vacuum associated with the corrugation 21 (applied through the mold block), will only become effective as the gap between the film 17 and the outer wall of the corrugation narrows. If the gap is too great, then air pressure can easily leak in and effectively destroy the vacuum force on the film 17, particularly when mold blocks are released, as shown in FIG. 2. To compensate this, the air pressure 20 encourages the film to move outwardly and at least support the corrugation.

When the main mold blocks 3, 5 and 7 are forming corrugated pipe, the air pressure 20 is adjusted to a lower level when the upstream mold block 3 separates outwardly as shown in FIG. 2. At this position, corrugation 21 has just been formed and the plastic film 17 remains quite soft and deformable. Also, the air pressure 20, is now acting on the entire corrugation 21 which is unsupported, as well as the portion of the film leading to corrugation 21.

Figure 3:
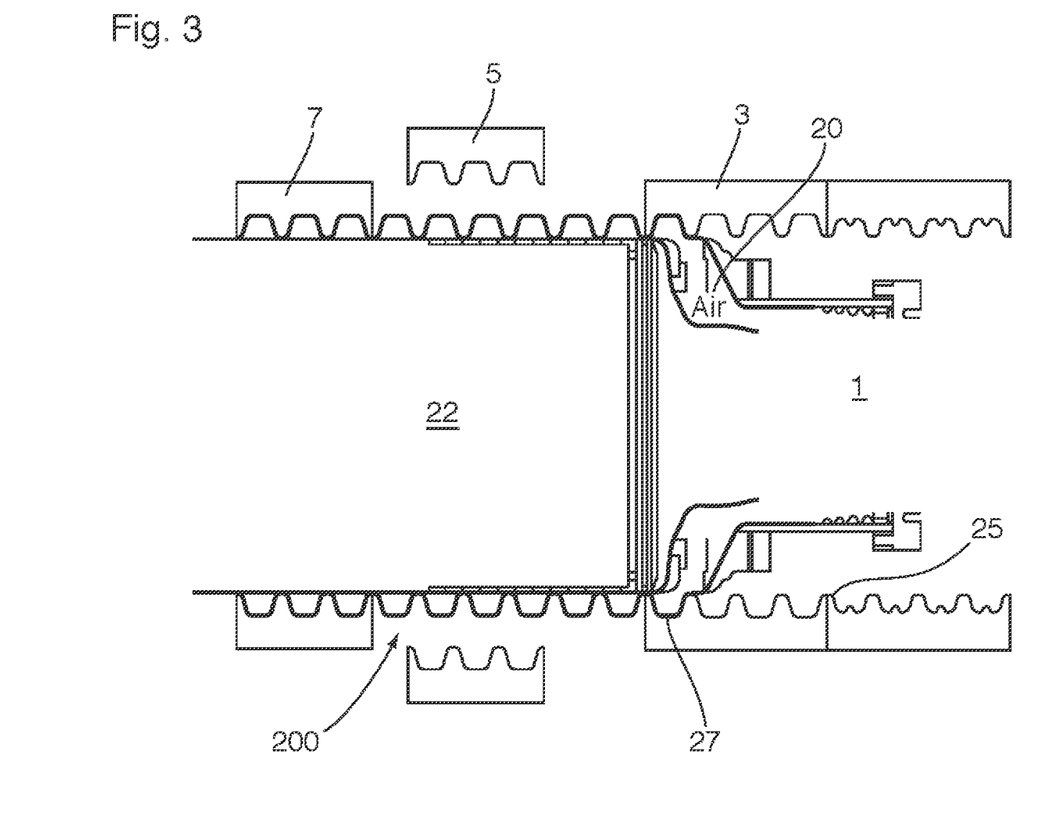

In the position as shown in FIG. 2, the air pressure is preferably decreased to a level to continue to support the corrugation 21, but not so great as to cause upstream deformation of the film 17 or to cause outward deformation of the corrugation 21. Some marginal deformation of the corrugation 21 will be corrected when the mold block 3 reengages this corrugation, as shown in FIG. 3. The vacuum source associated with mold block 3 is temporarily interrupted.

FIG. 2 shows the upstream mold block 3 partially shifted upstream whereas FIG. 3 shows upstream mold block 3 in a position reengaging corrugation 21 with the last or most downstream corrugation cell of the mold block. The secondary spigot forming mold block 11, has moved with the upstream mold block 3. In FIG. 3, the air pressure 20 is maintained at the support level and the vacuum force is reapplied to assist movement of the plastic film to form the corrugation. In this position, the air pressure is set to encourage both films of plastic to engage the mold blocks in the manner shown and to avoid upstream fouling of plastic film 17.

Whenever a trailing edge of an inward projection of a mold block, such as edge 29 in FIG. 1, is cooperating with the die head to form an upstream seal, the air pressure can be temporarily increased or pulsed to assist outward movement of the film. Each corrugation cavity of the mold blocks has such a trailing edge that cooperates with the die head.

In FIG. 3, the intermediate mold block 5, has now separated from the corrugated pipe 200 and has moved partially upstream. The vacuum force mold block 5 is turned off. A vacuum force is applied to the single corrugation 21 via the corrugation cavity 27.

Figure 4:
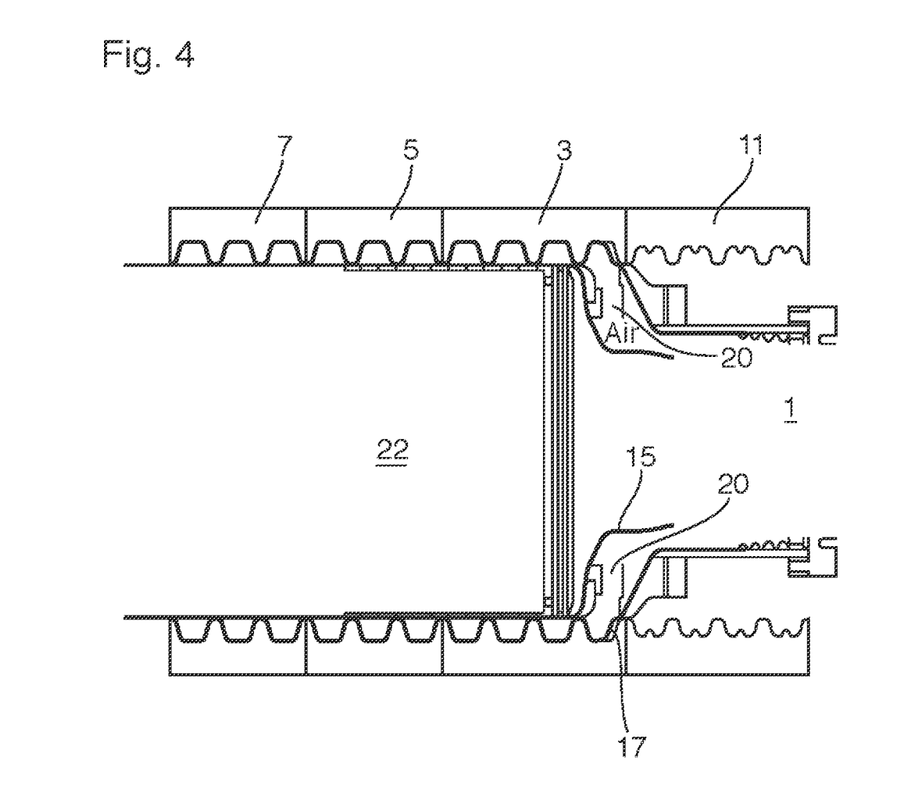

In FIG. 4, both the intermediate mold block 5 and the downstream mold block 7, have each released and moved upstream to reengage the corrugated pipe.

In FIG. 4, the vacuum associated with each corrugation cavity of the mold blocks 5 and 7 is fully ON to assist in additional cooling of the formed corrugations. As the corrugations are cooled, "shrinkage" occurs and air can leak into the gaps between the formed pipe and the mold blocks. This leaked air provides further cooling. In mold block 3, the three fully formed corrugations have the vacuum ON. The most upstream corrugation has the vacuum OFF until the trailing edge 29 essentially is opposite the die head outlet associated with film 17, at which time the vacuum is switched ON.

Figure 5:
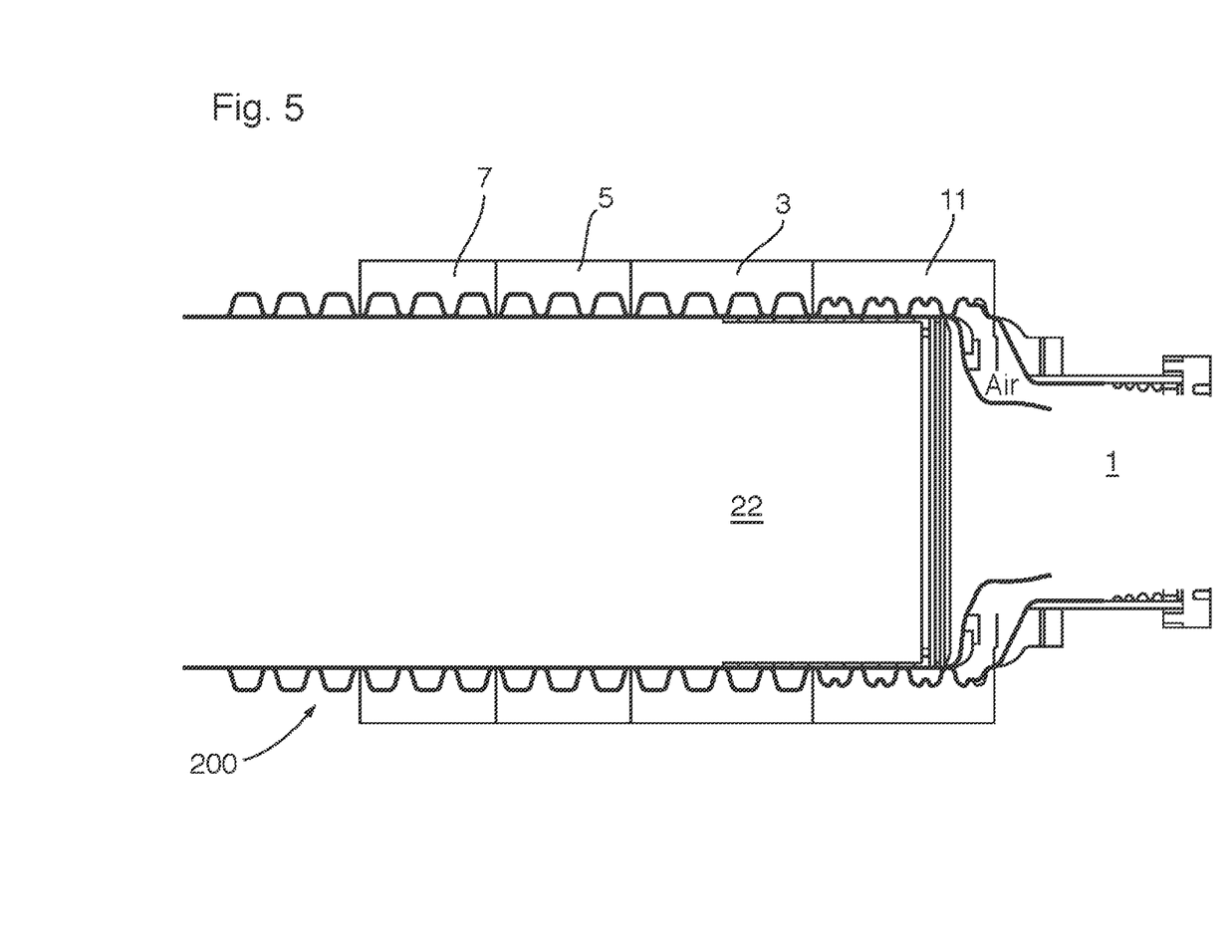

In FIG. 5, the secondary mold block 11, has now been activated by controller 300 and has moved across the cooling plug 22 and follows the upstream mold block 3. The intermediate and downstream mold blocks will also move further downstream before disengaging the corrugated pipe or starting their return upstream movement. The primary mold blocks 3, 5 and 7 can have the vacuum ON.

The secondary mold block 11 forms corrugations of reduced diameter and, in this preferred embodiment, all of these corrugations have been provided with a center recess that receive an "O" ring. The first 3 fully formed spigot corrugation in FIG. 5, have the vacuum ON with the higher air pressure until the mold block is released.

Figure 6:
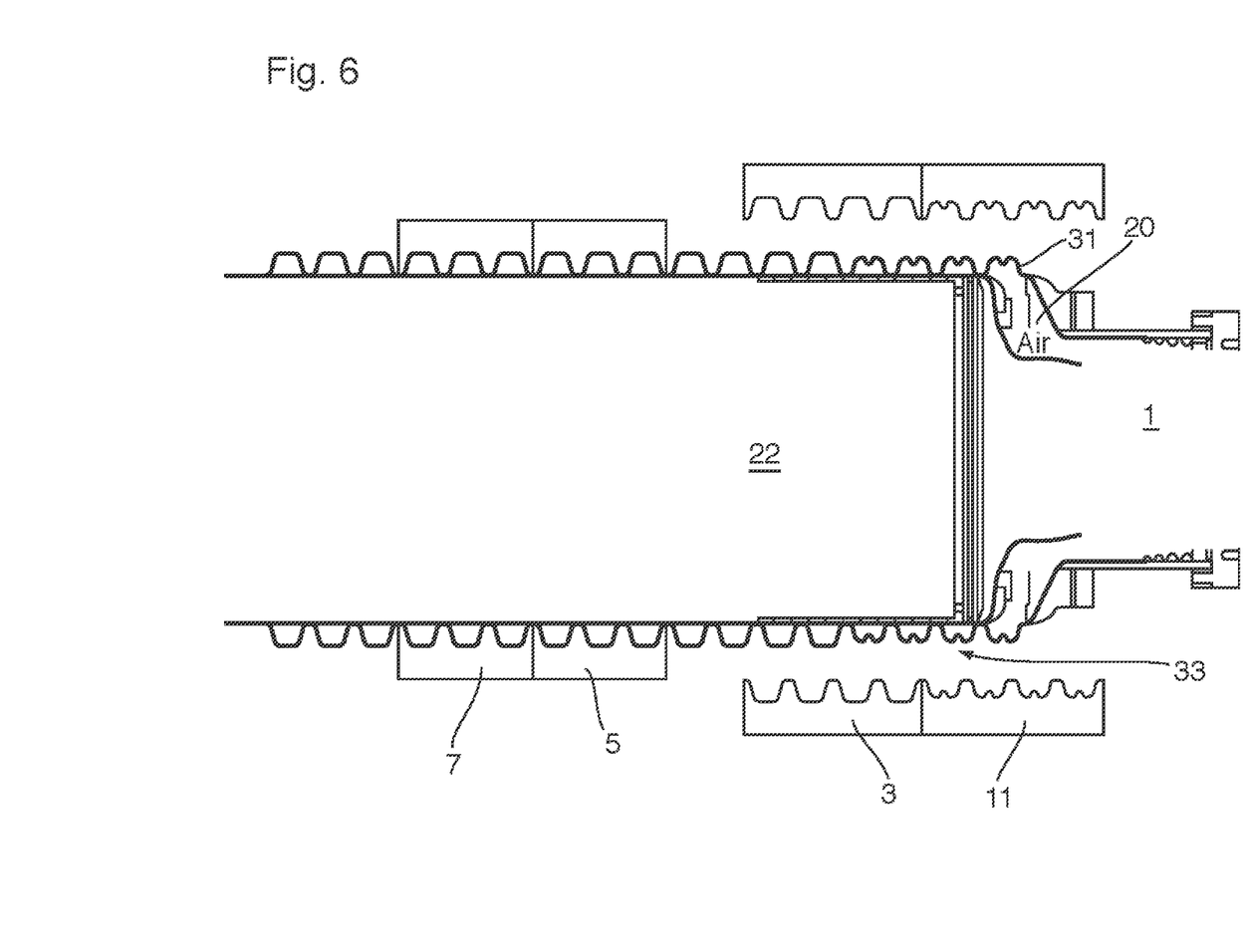

In FIG. 5, the plastic films 15 and 17 are in engagement with the secondary mold block 11 and the secondary mold block is about to separate from the formed spigot and move outwardly relative to the cooling plug 22. This aspect is shown in FIG. 6 where both the secondary mold block 11 and the upstream mold block 3 have released the corrugated pipe 100 and are moving upstream. With these mold blocks separated from the corrugated pipe and spigot, the air pressure 20 is reduced to avoid deformation of the most upstream spigot corrugation 31 which is mostly self-supported. The air pressure 20 is sufficient to assist in maintaining the corrugation 31, until such time as the upstream mold block 3 can reengage and support the corrugation portions of the spigot.

Figure 7:
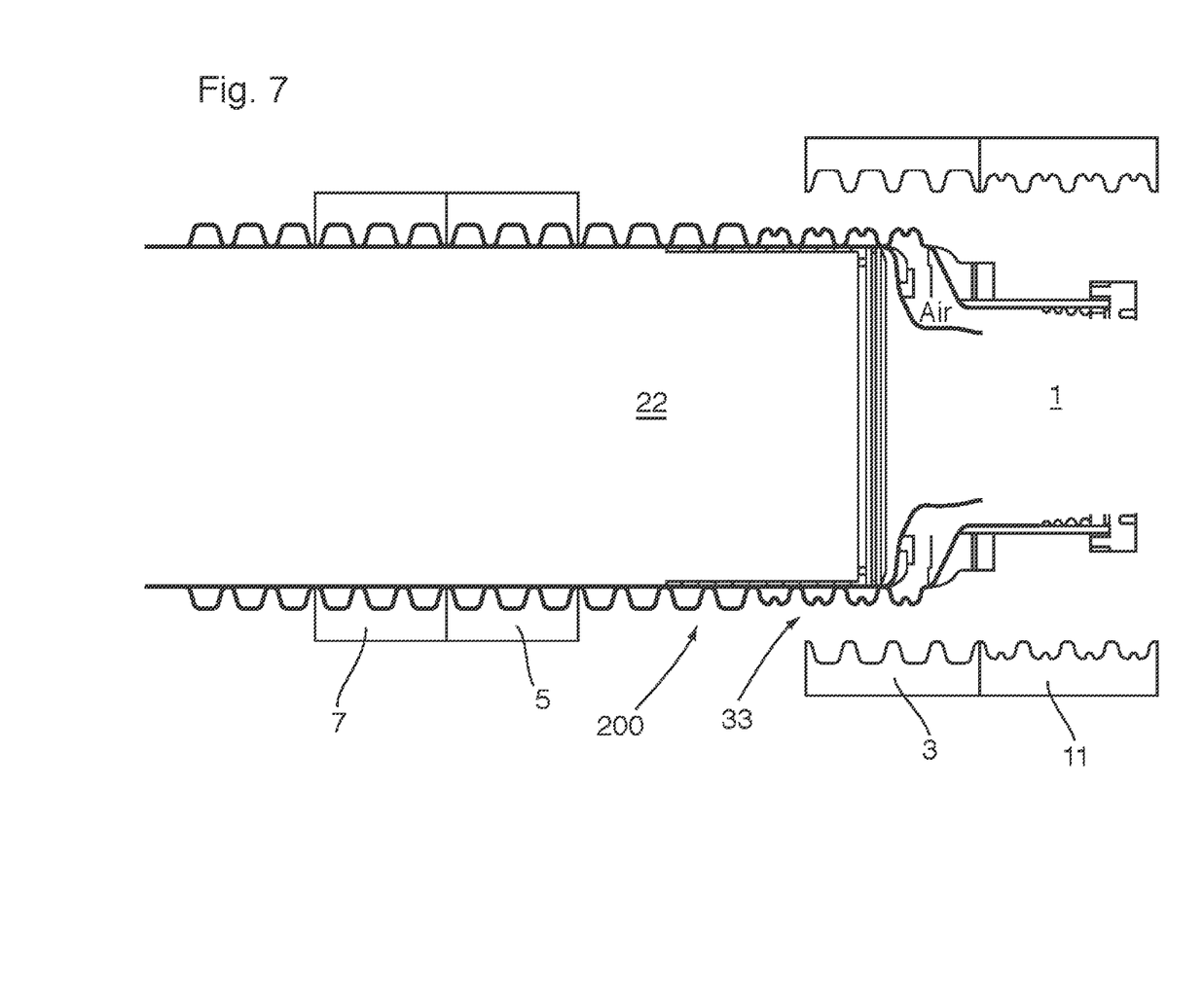

FIG. 7 shows further movement of both the upstream mold block 3 and the secondary mold block 11.

Figure 8:
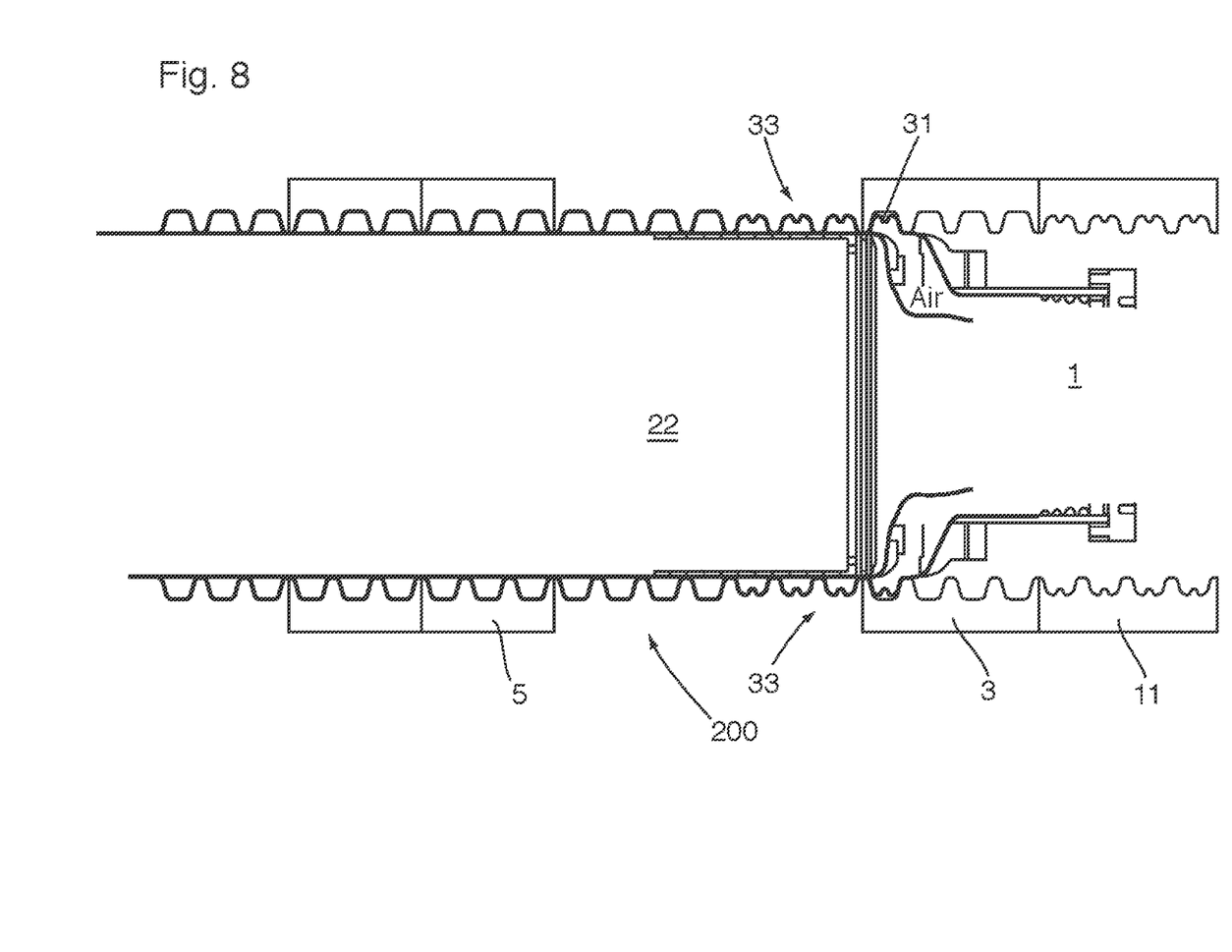

FIG. 8 shows that the upstream mold block 3 has now moved inwardly and is reengaging and supporting the upstream corrugation 31 of the spigot portion 33. The corrugation cavities of the upstream mold block 3 are of greater diameter than the diameter of the spigot corrugations. However, these cavities are sufficient to support and cool the spigot corrugations. Thus, the upstream mold block 3 and the corrugation cavities thereof, are designed to support the last formed spigot corrugation 31 and the intermediate mold block 5 will support the other formed corrugations of the spigot. The air pressure 20 in FIG. 8, is at the reduced support level to avoid upstream deformation over the die head.

The vacuum force may be reduced when any of the primary mold blocks 3, 5 and 7 are supporting spigot corrugations.

Figure 9:
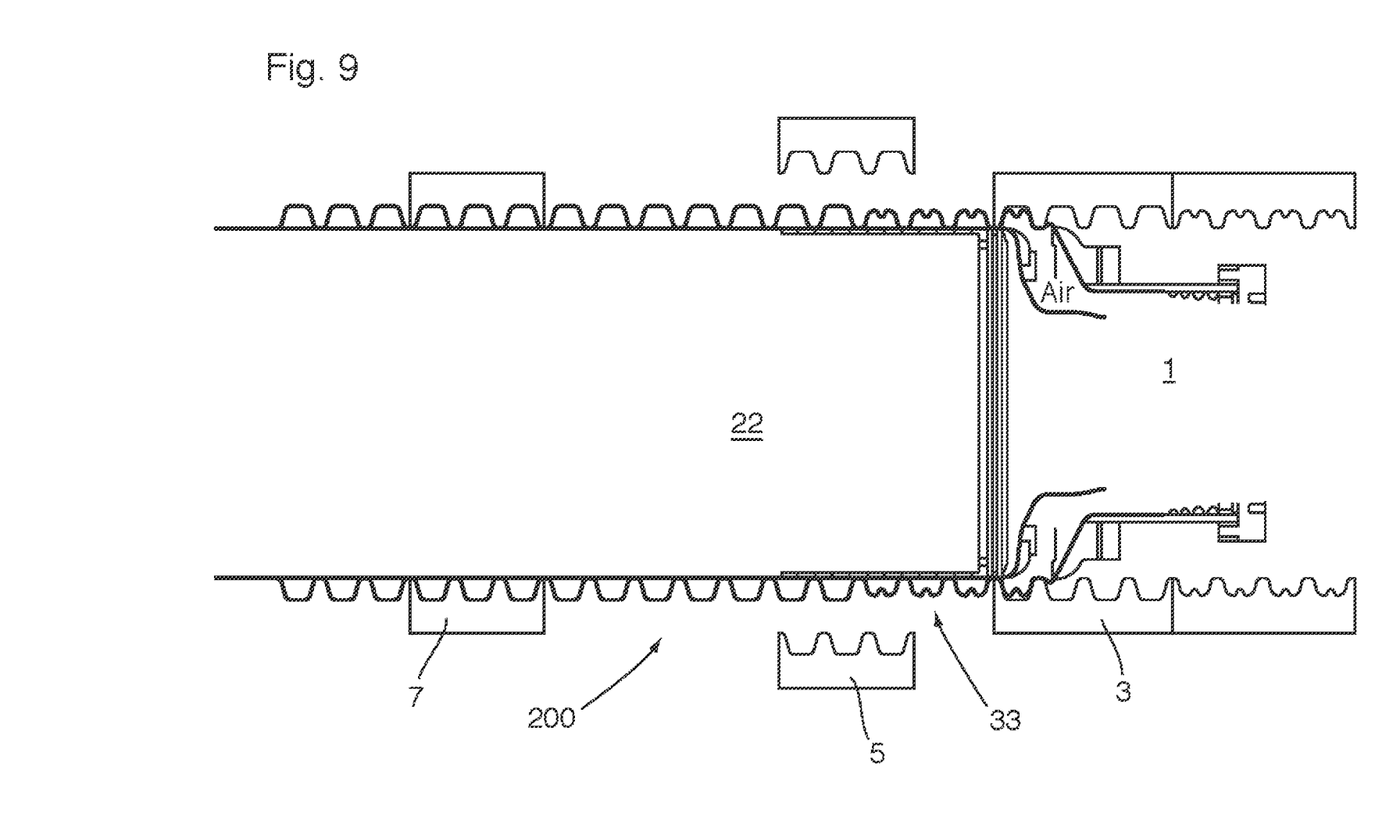

As shown in FIG. 9, the intermediate mold block 5 has released the corrugated pipe 200 and is moving forward to cooperate with the upstream mold block 3 for supporting a downstream portion of the formed spigot.

Figure 10:
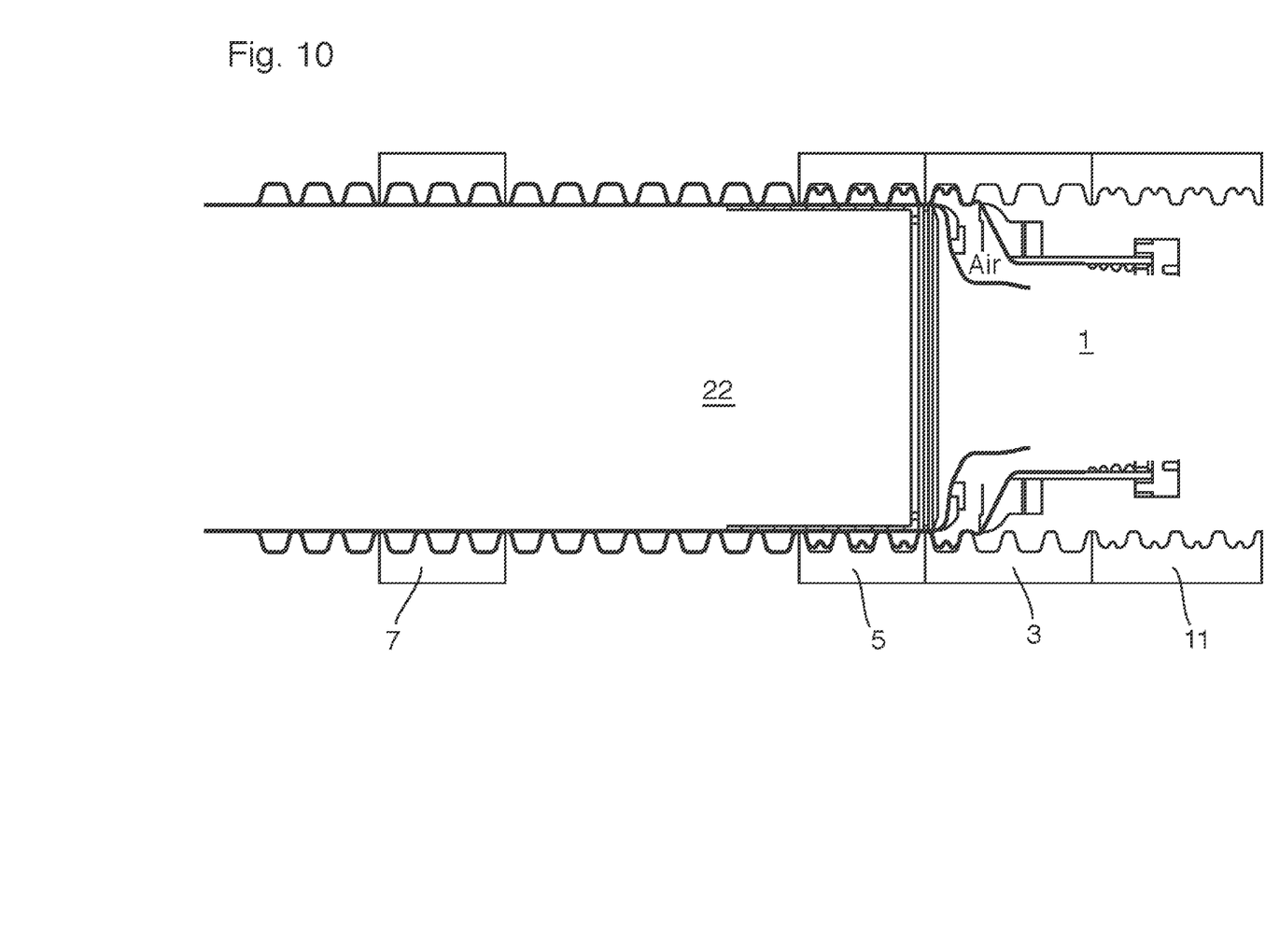

In FIG. 10, the intermediate mold block 5 is now supporting the additional corrugations of the spigot. Again, the actual cell size of the corrugation cavities of the intermediate mold block 5, are oversized relative to the formed spigot corrugations, but these cavities provide support and additional cooling of the spigot corrugation. The vacuum applied to the individual corrugation cells of the intermediate mold block 5 as well as at least the last corrugation cavity of the upstream mold block 3, may be reduced or may be less effective (due to air leakage) when spigot corrugations are present. The vacuum force is sufficient to maintain the outer shape, but not to draw the outer face of the formed spigot corrugation into full engagement with the corrugation cavities. The corrugations of the spigot portion are of a reduced diameter necessary for forming a proper connection with a female connector that can be at the same diameter as the formed pipe, if each pipe has a respective spigot. Alternatively, the female connector has two cavities with one sized to seal with the full size corrugated pipe and a second cavity for engaging a spigot. Therefore, the vacuum applied during this process time, is reduced.

Figure 11:
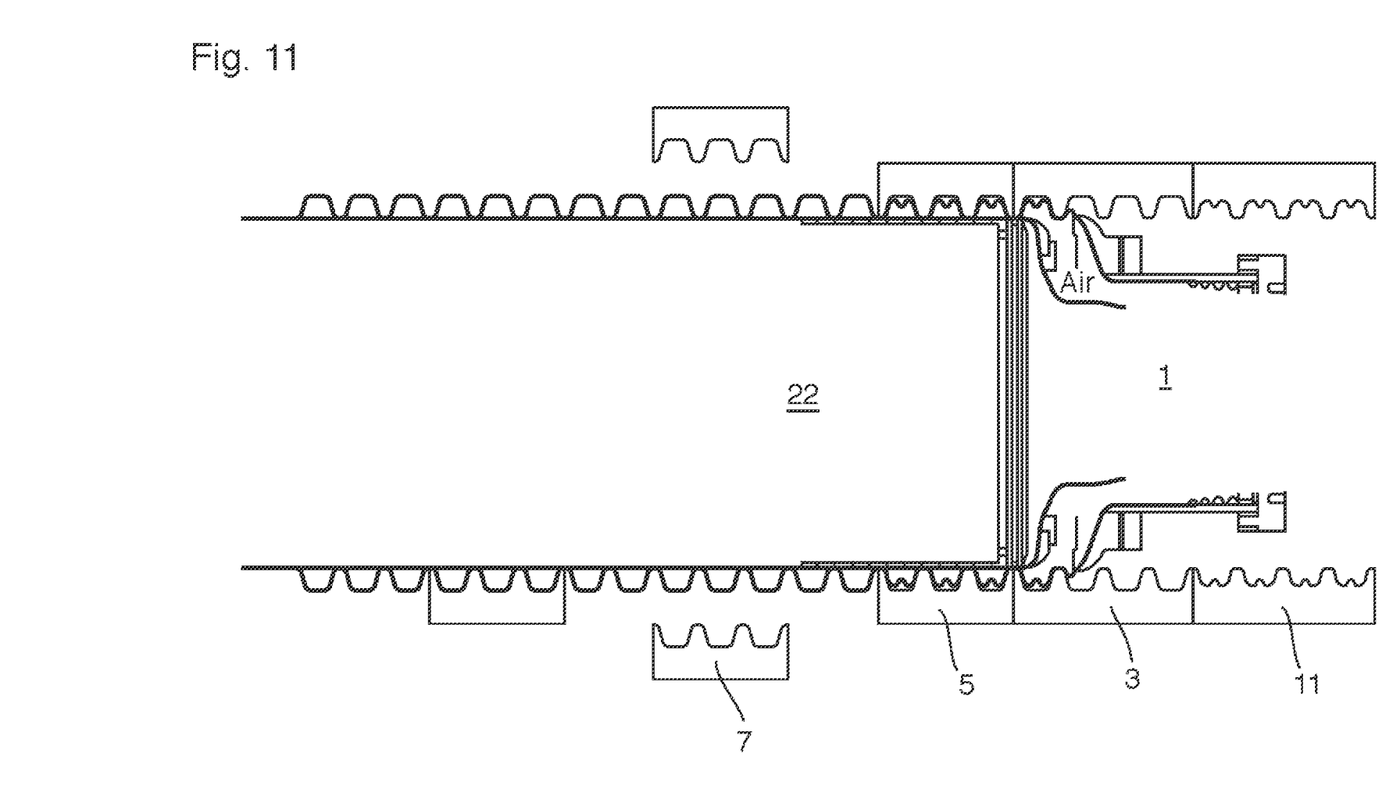

In FIG. 11, the downstream mold block 7 has now separated from the corrugation pipe and is moving in an upstream direction.

Figure 12:
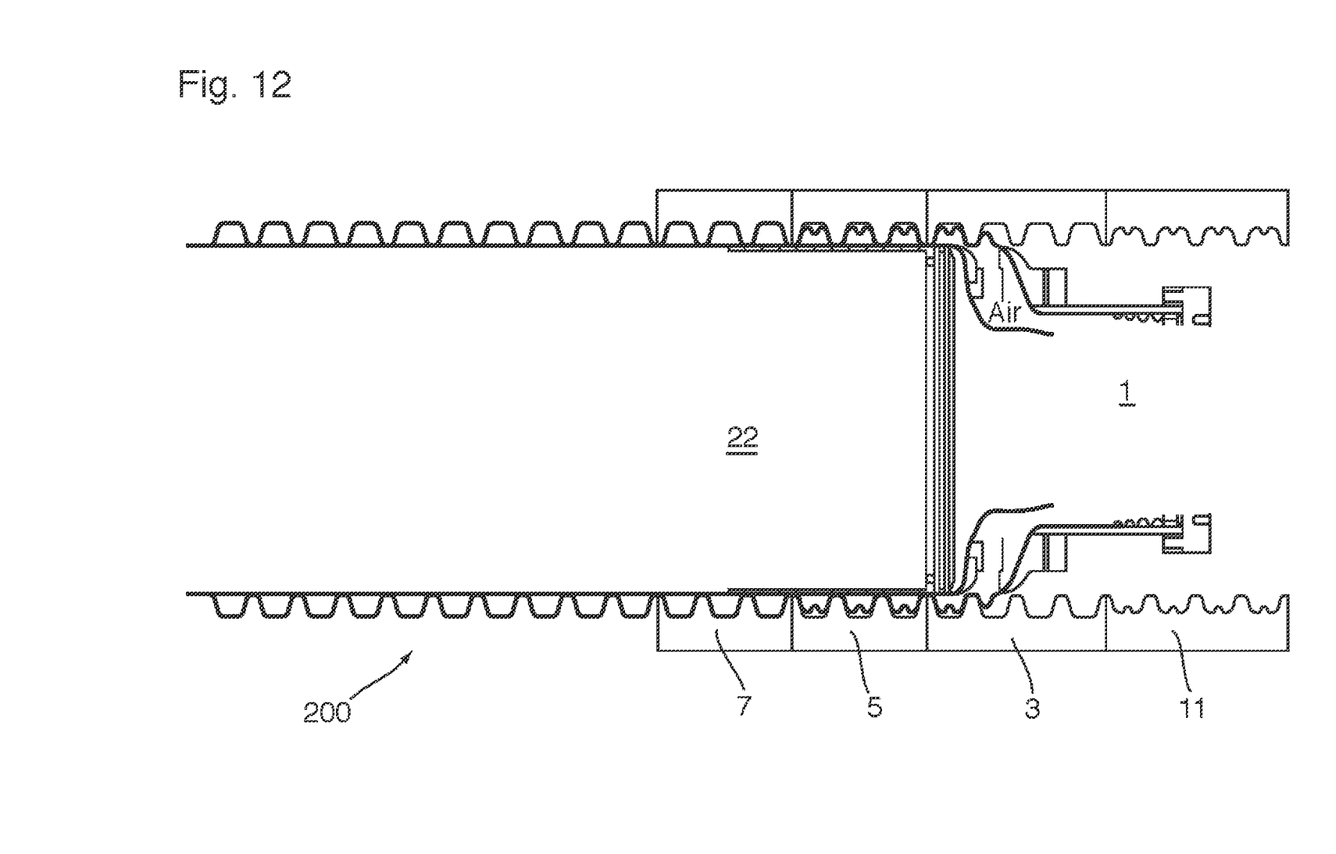

In FIG. 12, the downstream mold block 7 has reengaged with the corrugations of the pipe.

Figure 13:
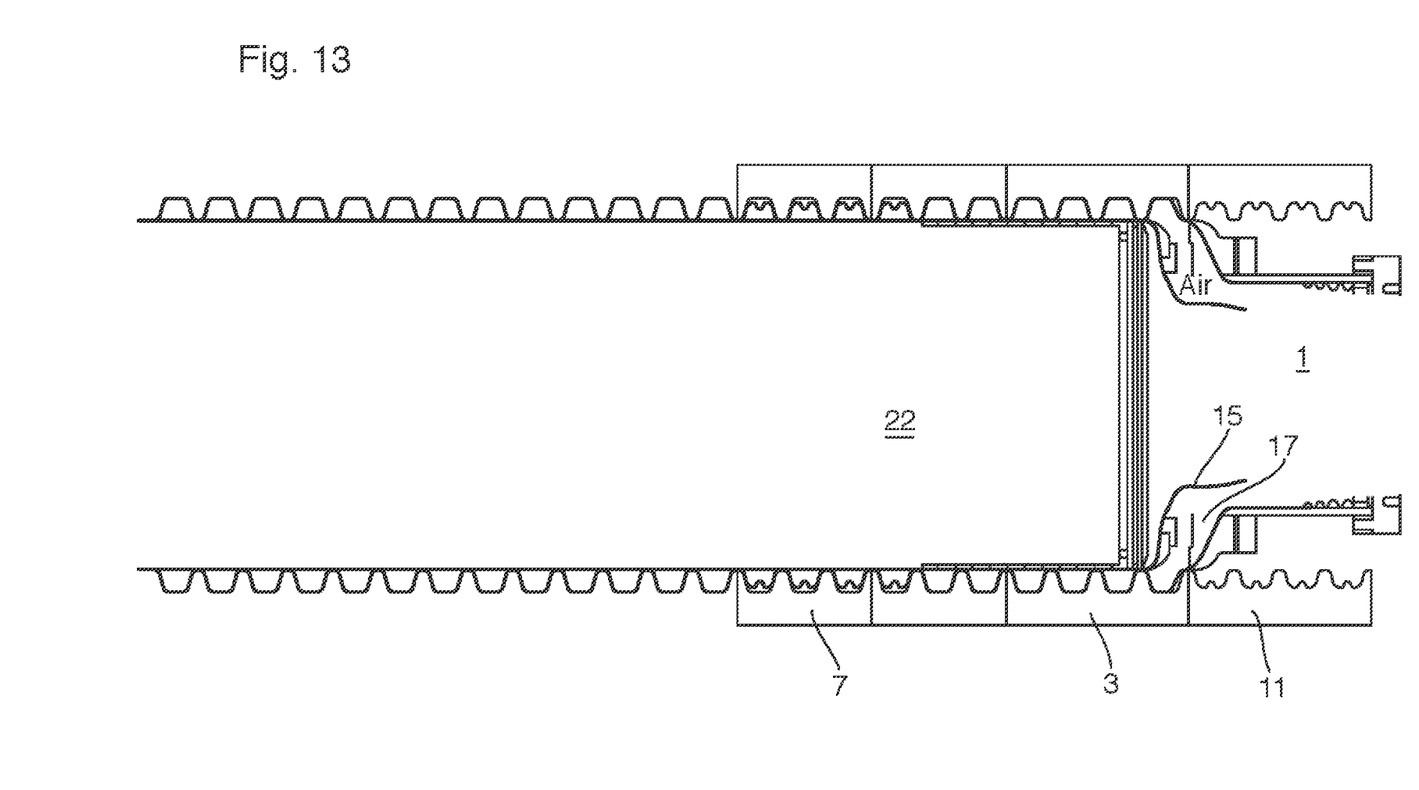

FIG. 13 shows a further position of the corrugated pipe where pulsating of the mold blocks has occurred and the downstream mold block 7 is engaging some corrugations of the spigot. With the mold block in this position, the vacuum force is mostly used for creating an airflow for additional cooling and the outer shape of the spigot corrugations are set. It can be seen in FIG. 13, that the upstream mold block 3 is about to disengage the corrugated pipe and mold block 3 will be pulsed upstream for forming of additional corrugations. The secondary mold block 11 will not engage the plastic film 17 and may be referred to as in a parked or moving parked position.

A controller is used to determine when the secondary mold block 11 is to be used for forming of a spigot connection. This can be set according to a programmed length of pipe such as a spigot is formed at predetermined points or the controller can be set for forming a spigot at different positions.

The figures and the above description is based on the secondary mold block 11 only being used once for forming of the spigot connection. However, it can be appreciated that the mold block could be separated from the pipe and brought back into engagement with the pipe for forming a longer spigot, if desired. Further multiple secondary mold blocks can be used.

The three main mold blocks 3, 5 and 7, is a preferred embodiment; however, the system can operate satisfactory with only two main mold blocks or a greater number of mold blocks. It can also be appreciated that the secondary mold block 11 need not be a single mold block, but could be a plurality of mold blocks. Adding additional mold blocks can be of assistance in shuffling of the mold blocks back to the upstream positions. The primary mold blocks have been described as separate from the secondary mold block, but the secondary mold block could include several full size corrugations. The present arrangement allows both primary and secondary mold blocks to be supported and move in a common manner.

With the above arrangement, it is possible to form spigot connections inline as an integral part of corrugated pipe using the pulsating corrugator and the method described herein.

Although various preferred embodiments of the present invention have been described herein in detail, it will be appreciated by those skilled in the art that variations may be made thereto without departing from the appended claims.

What is claimed is:

1. A pulsating corrugator comprising a plurality of main mold blocks used for in line forming of corrugated pipe of double wall construction, where the corrugated pipe includes an inner wall of smooth wall of a first diameter and an outer corrugated wall attached to said inner wall at an inside edge of each corrugation and extending outwardly therefrom to a second diameter that is greater than said first diameter;
   at least one secondary mold block upstream of and used in combination with said main mold blocks for selectively forming an inline double wall spigot connection as part of said corrugated pipe with said spigot connector having an inner smooth wall of said first diameter with outer corrugations attached to said inner smooth wall and of a maximum diameter intermediate said first and second diameters;
   said at least one secondary mold block, during forming said corrugated double wall pipe using said main mold blocks, being in a position upstream of plastic extrusion outlets used in forming the walls of the double walled corrugated pipe;
   a controller for controlling pulsating movement of said main mold blocks and selective use of said at least one secondary mold block to move with said primary mold blocks to form said spigot connection, separate therefrom and thereafter return to said upstream position; and wherein
   said controller controls the pressure of an air supply that introduces support air between said extruded plastic outlets at a first pressure for each corrugation of said first diameter and at a lesser pressure for supporting a last formed spigot corrugation as the secondary mold block is released from the formed spigot connections and moved to said upstream position.

2. The pulsating corrugator as claimed in claim 1, wherein said main mold blocks and said at least one secondary mold block have corrugation at the same pitch and said main blocks engage said formed spigot corrugations released from said at least one secondary mold block to continue to cool said spigot corrugations.

3. The pulsating corrugator as claimed in claim 2, wherein said controller controls a vacuum force exerted by said primary mold blocks on said corrugations of said first diameter and exert a reduced vacuum source when the respective main mold block is engaging a secondary corrugation.

4. The pulsating corrugator as claimed in claim 1, wherein said main mold blocks and said at least one secondary mold have the same orientation and move inwardly and outwardly relative to the formed double wall corrugated pipe in the same direction.

5. The pulsating corrugator as claimed in claim 1, wherein said at least one secondary mold block is one secondary mold block which moves in unison with the primary mold block immediately downstream thereof with respect to both separation from the corrugated pipe and movement in the length of the pulsating corrugator.

* * * * *